No. 783,371. PATENTED FEB. 21, 1905.
E. F. DONNENWIRTH.
DRAFT EQUALIZER.
APPLICATION FILED MAY 2, 1904.
2 SHEETS—SHEET 1.
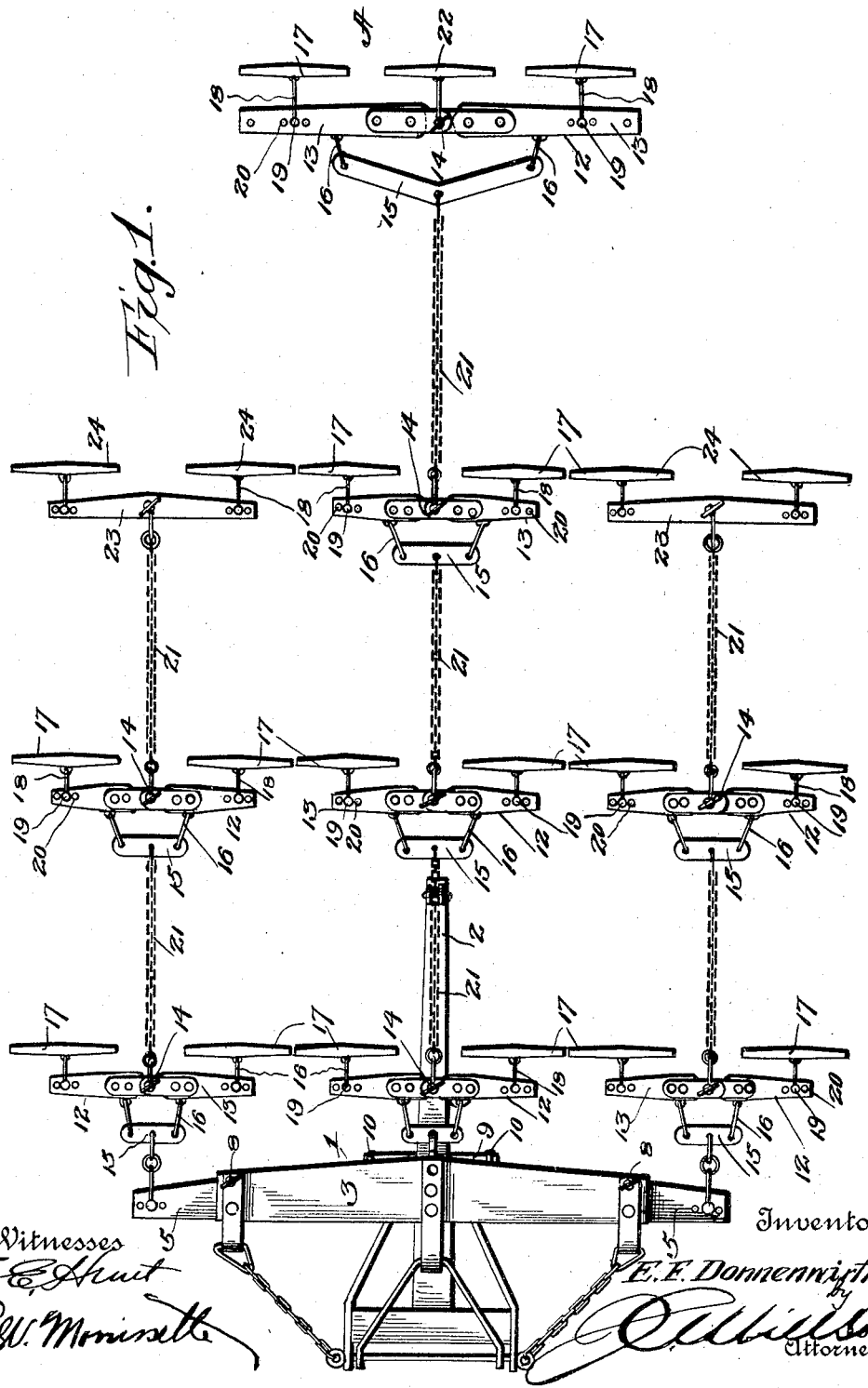

No. 783,371. PATENTED FEB. 21, 1905.
E. F. DONNENWIRTH.
DRAFT EQUALIZER.
APPLICATION FILED MAY 2, 1904.
2 SHEETS—SHEET 2.
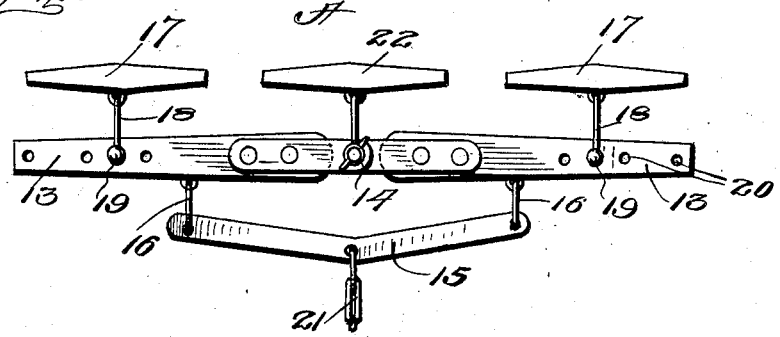
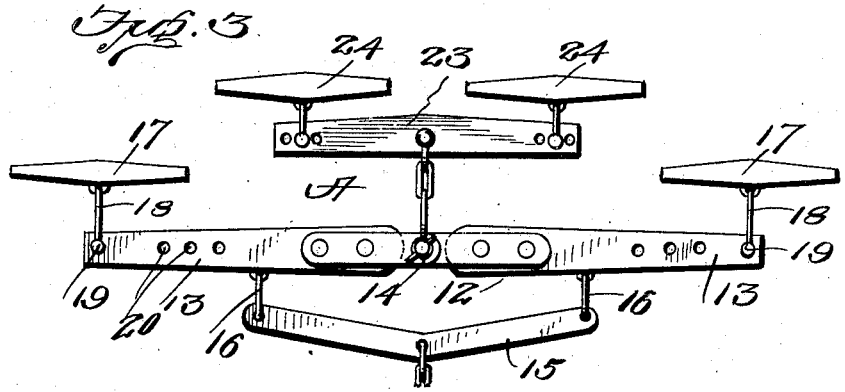
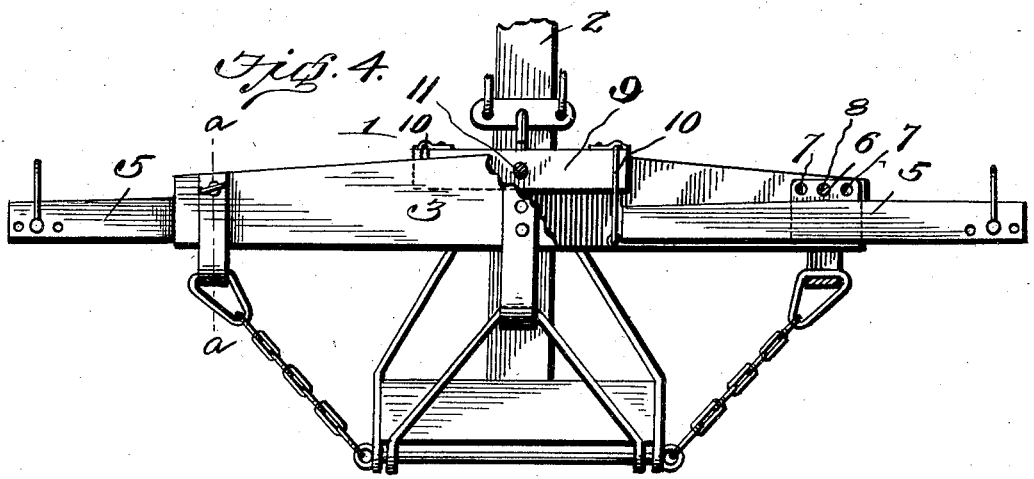

No. 783,371. Patented February 21, 1905.

UNITED STATES PATENT OFFICE.

EDMUND F. DONNENWIRTH, OF DAVISVILLE, CALIFORNIA.

DRAFT-EQUALIZER.

SPECIFICATION forming part of Letters Patent No. 783,371, dated February 21, 1905.

Application filed May 2, 1904. Serial No. 206,068.

*To all whom it may concern:*

Be it known that I, EDMUND F. DONNENWIRTH, a citizen of the United States, residing at Davisville, in the county of Yolo and State of California, have invented certain new and useful Improvements in Draft-Equalizers, of which the following is a specification.

My invention is an improved draft-equalizer; and it consists in the construction and combination of devices hereinafter described and claimed.

The object of my invention is to provide an improved form of draft-equalizer adapted for use with teams of many horses for drawing harvesters and other heavy machinery and vehicles and for distributing the stress upon the animals according to their capacities, so that animals which vary materially in size, weight, and strength may be used in the same team without overloading the weaker animals.

In the accompanying drawings, Figure 1 is a top plan view showing the arrangement of my equalizing devices for a team of twenty-one horses. Fig. 2 is a similar view, on a larger scale, showing the details of construction of the equalizer for the leading center team. Fig. 3 is a similar view showing a modification in the arrangement thereof. Fig. 4 is a similar view of the main or draft bar and its connections with parts broken away to disclose subjacent parts. Fig. 5 is a detail sectional view of the same, taken on the plane indicated by the line *a a* of Fig. 4.

The draft-bar 1, which is here shown as connected to the tongue 2 of a harvester or other machine, is composed of an upper bar 3 and a lower bar 4, spaced apart to a suitable extent. Between the upper and lower bars, at the ends thereof, are pivoted the doubletree-bars 5 at a suitable distance from the outer ends of the latter, the doubletree-bars being shiftable on their pivots. As here shown, the doubletree-bars have fulcrum-plates 6 on their upper and lower sides at a suitable distance from their outer ends, and said plates project forwardly from said doubletree-bars and are provided in their said projecting portions with series of adjusting-openings 7 for the insertion of the pivot-pins 8, said series of openings adapting the said bars to be shifted on their pivots, as will be understood.

A bar 9 has its ends connected to the inner ends of the doubletree-bars by links 10. Teams may be hitched to the outer end portions of the doubletree-bars and also to the intermediate bar 9, and by shifting the bars 5 on their pivots the load stress may be proportionally distributed to the center and side teams.

When the side teams are unhitched and the machine is being drawn to or from work by the center teams, the intermediate bar may be secured against forward and rearward movement by a pin 11, in alined openings in said intermediate bar and the upper and lower bars of the draft-bar, at the centers thereof, as indicated in dotted lines in Fig. 4.

Any desired number of equalizing draft devices may be connected, one in advance of another, to the intermediate bar and the outer ends of the doubletree-bars, as indicated in Fig. 1.

Each equalizing draft device comprises a doubletree 12, formed of members 13, having their inner ends pivotally connected together, as at 14, a yoke 15 in rear of the central portion of said doubletree and having its ends connected, as by means of links 16, to the respective pivotally or flexibly connected members, and swingletrees 17, shiftably connected to the outer ends of said members, as by means of clip-links 18 and pins 19, the latter being adapted to be placed at any desired distance from the ends of said members by the series of openings 20, with which said members are provided. The center of each yoke is connected by a shaft-chain 21 or other draft element to the pivotal axis of the doubletree 12 next in rear thereof, thereby applying the draft of each advance team to the center of the flexible doubletree next in rear thereof. The connections between the ends of each yoke and the pivotally-connected members of its doubletree are progressively nearer the inner ends of said members in the respective shaft devices as the same extend to the rear— that is to say, the connections between the ends of a yoke in one of the rear draft devices are nearer the inner ends of the members of its doubletree than are those of the draft device next in advance thereof.

The front equalizing device A for the lead-horses of the center teams has, in addition to the swingletrees attached to and shiftable in the outer ends of its pivotally-connected members, a swingletree 22, attached to the pivotal axis of the said members, as shown in Figs. 1 and 2.

A lead-bar 23, having swingletrees 24 at its ends, may be substituted for the swingletree 22 when it is desired to employ four horses for the center leading team, as indicated in Fig. 3. A similar lead-bar 25 and swingletrees 26 are employed for the leading side teams, as shown in Fig. 1.

It will be understood that the number of the equalizing draft devices may be varied according to the number of draft-animals to be employed, and I do not desire to limit myself in this particular.

Various changes in the form, proportion, and the minor details of construction may be resorted to without departing from the principle or sacrificing any of the advantages of this invention.

Having thus described my invention, what I claim as new, and desire to secure by Letters Patent, is—

In a draft-equalizer, the combination of a draft-bar, a doubletree adjustably connected to each end of said draft-bar, an intermediate bar 9 connected to the inner ends of said doubletrees by links, and a pin adapted to pass through openings in said intermediate bar and draft-bar to attain a rigid central draft-line, said pin being removable to permit the ends of the doubletree to have a free movement, substantially as described.

In testimony whereof I have signed my name to this specification in presence of two witnesses.

EDMUND F. DONNENWIRTH.

Witnesses:
JOHN B. ANDERSON,
ELI SNIDER.